US005252406A

United States Patent [19]

Eid et al.

[11] Patent Number: 5,252,406

[45] Date of Patent: Oct. 12, 1993

[54] SUPPORT FOR TONER TRANSFER

[75] Inventors: Bernard A. Eid, Champagne sur Seine; Jeannine Rigola, Chalon sur Saone, both of France

[73] Assignee: Eastman Kodak Company, Rochester, N.Y.

[21] Appl. No.: 778,080

[22] PCT Filed: Jun. 13, 1990

[86] PCT No.: PCT/FR90/00416

§ 371 Date: Dec. 12, 1991

§ 102(e) Date: Dec. 12, 1991

[87] PCT Pub. No.: WO90/16016

PCT Pub. Date: Dec. 27, 1990

[30] Foreign Application Priority Data

Jun. 13, 1989 [FR] France ................................ 8908156

[51] Int. Cl.[5] ................................................ B32B 9/00

[52] U.S. Cl. ................................ 428/474.4; 428/195; 428/216; 428/473.5; 428/475.2; 428/477.4; 428/478.2; 428/480; 428/913; 428/914

[58] Field of Search ............... 428/195, 204, 216, 918, 428/419, 484, 474.4, 473.5, 475.2, 477.4, 478.2, 480, 913, 914, 315.5, 341, 219

[56] References Cited

U.S. PATENT DOCUMENTS

| | | | |
|---|---|---|---|
| 4,168,338 | 9/1979 | Kato et al. | 428/219 |
| 4,370,379 | 1/1983 | Kato et al. | 428/341 |
| 4,956,225 | 9/1990 | Malhotra | 428/216 |
| 5,055,371 | 10/1991 | Lee et al. | 428/315.5 |

*Primary Examiner*—Patrick J. Ryan
*Assistant Examiner*—William Krynski
*Attorney, Agent, or Firm*—Willard G. Montgomery

[57] ABSTRACT

Disclosed is a pigment receiving support for electrostatic transfer.

The support comprises a base of transparent or non-transparent plastic material and a receiving layer. The receiving layer comprises a surface-active agent and a hydrophilic binder. The concentration of the surface-active agent is at least 1 mg/dm$^2$, and is at least 2 times greater than that of the hydrophilic binder, preferably 10 times greater than that of the hydrophilic binder.

7 Claims, No Drawings

SUPPORT FOR TONER TRANSFER

The present invention concerns a receiving support intended to receive, via transfer and thermal fixing, pigments such as those contained in electrostatic toners.

One uses, currently, for overhead projections transparent sheets of a flexible plastic material which may be prepared by various means, for example special pencils. It is also very desirable to be able to use electrostatic copying means. Sheets capable of being printed by electrostatic copying exist, but they are, most often, expensive and not universal, that is to say adapted to a given photocopier.

Another application in which one uses electrostatic toners, transferred and thermally fixed on a support, is magnetography. In this case, also, it may be desirable to have available a plastic material support on which the pigments can be transferred, for example to print bar codes.

In all the cases, these supports must have certain qualities: they must permit a good transfer of pigments; the latter must adhere firmly to the support; finally, in the case where one uses it for overhead projection, the support must maintain a transparent appearance.

The supports of prior art are, in general, constituted of a support film and a receiving layer formed of a hydrophobic material which may be chosen from among a wide range of polymers or copolymers.

U.S. Pat. No. 4,259,422 describes a transparent sheet containing a receiving layer formed of a hydrophilic material such as gelatin. This receiving layer contains, in addition, a hardener and matting beads and it adheres to the support via the intermediary of a sub. U.S. Pat. No. 3,549,360 described a transparent sheet of a polymeric material treated with a surface-active agent. The polymeric material support had undergone a prior polishing treatment which renders it shiny like a mirror.

Surface-active agents have been used in transparent sheets for electrostatic copying, like an antistatic agent, to prevent, in particular, the sheets from sticking to one and other upon stacking. Likewise, U.S. Pat. Nos. 4,071,362, 4,415,626 and 4,526,847 describe the use of such surface-active agents. They are always associated with polymeric receiving layers, or used as a backing layer as in the previously cited U.S. Pat. No. 4,259,422.

In all these documents, the surface-active agent is added in low quantities with respect to the binder of the receiving layer.

The present invention has as its subject-matter a support for thermal transfer of electrostatic toner pigments capable of being used in any system functioning with such pigments, such as electrophotography and magnetography; this support exhibits the characteristics of transfer, transparency and adhesive strength mentioned above, and is inexpensive.

One has found, surprisingly, that contrary to the receiving layers of prior art which always contains either hydrophilic or hydrophobic polymers, or their mixtures, with possibly a surface-active agent of which the concentration is lower than that of the polymer, one could obtain supports of excellent quality for pigment transfer, permitting a good fixing of the pigments, with altering the transparency, if that is desired, with a receiving layer constituted of a surface-active agent associated with a very low concentration of hydrophilic binder, the surface-active agent concentration being at least 2 times higher than that of the hydrophilic binder.

The present invention has as its subject-matter a support for thermal transfer of electrostatic toner pigments, constituted of a base and a receiving layer for the pigments, characterized in that the receiving layer is formed of a hydrophilic binder and of a surface-active agent, of which the concentration is at least 1 $mg/dm^2$ and is at least 2 times higher than that of the hydrophilic binder.

In a preferred embodiment, the surface-active agent concentration is at least 5 times higher than that of the hydrophilic binder, and even more favorably, the surface-active agent concentration is more than 10 times higher than that of the hydrophilic binder.

It is advantageous that the ratio of the surface-active agent/gelatin concentrations be very high, capable of going up to 30 to 50. It is not, however, useful to increase the surface-active agent concentrations to very high values; in effect, at too high surface-active agent concentrations, the support becomes tacky and/or grannular. The favorable surface-active agent concentrations are comprised between 0.5 and 5 $mg/dm^2$.

In a preferred embodiment, the hydrophilic binder is gelatin.

One may use any surface-active agent which might be soluble or capable of being dispersed in an aqueous solution of hydrophilic binder and which did not have an unfavorable effect on the appearance and the transparency of the support after the thermal transfer. In preferred embodiments, one uses, as the surface-active agent, a phosphoric ester, an alcohol or an ethoxylated phenol.

The base of the receiving support according to the invention may be constituted of any suitable polymer known in the art such as polyesters, polycarbonates, polyamides, polyimides, etc. In the case of the application to transparent sheets for overhead projection, the base must be transparent. It must also be able to withstand the temperatures used in electrostatic copiers to fix the pigments by fusion onto the paper.

The thickness of the support is, in general, comprised between 0.05 and 0.2 mm. It may take any useful form, such as sheets, strips, etc.

In practice, one prepares an aqueous solution of the hydrophilic polymer and of the surface-active agents at concentrations necessary to obtain the desired final concentrations, according to the thickness of the layer, and one applies this solution by any known coating means at a thickness comprised between 0.02 and 0.1 mm, wet, then one allows it to air-dry.

One obtains receiving supports for electrostatic toner pigments which permit a good transfer of the pigments with a good adherence, while maintaining a particularly advantageous transparent appearance when one uses these supports as a transparent sheet for overhead projection. These supports may also be used for any appliance in which one transfers electrostatic toner pigments and in which one fixes them by fusion on a final support. Another application is the printing of bar codes by magnetography.

The following examples illustrate the invention.

EXAMPLES 1-12

Aqueous solutions are prepared comprising as surfactant GAFAC® PE510 (alkylphenoxypolyethoxyethylester of phosphoric acid, sold by GAF), and gelatin at concentrations reported in Table I below. Said solutions are coated on a non-substrated transparent support ESTAR® (polyethylene terephthalate sold by Eastman Kodak Company) having a thickness of 0.1 mm, at a wet thickness of 0.05 mm and air dried. The support is then used to transfer the electrostatic toner, which is heat fixed at a temperature of about 80°-90° C.

The results reported in table I below as regards the transfer quality and the support appearance range from + (poor) to ++++++ excellent. 0 means no transfer at all. The comparative examples are those carried out with surfactant and gelatine ratios outside the range claimed in the present invention. It is to note that there is no transfer if there is not enough surfactant (Ex. 11) or if the $C_1/C_2$ ratio is inverted (Ex. 12), i.e. when there is more gelatin than GAFAC.

TABLE I

| Examples | GAFAC Conc. $C_1$ g/l (coverage mg/dm$^2$) | Gelatin Conc. $C_2$ g/l (coverage mg/dm$^2$) | $C_1/C_2$ | Transfer | Appearance |
|---|---|---|---|---|---|
| Invention | | | | | |
| 1 | 3 (1,5) | 1 (0,5) | 3 | ++++ | ++ |
| 2 | 2,5 (1,25) | 0,5 (0,25) | 5 | ++++ | ++ |
| 3 | 3 (1,5) | 0,5 (0,25) | 6 | ++++ | ++ |
| 4 | 2,5 (1,25) | 0,25 (0,12) | 10 | ++++ | +++ |
| 5 | 5 (2,5) | 0,5 (0,25) | 10 | ++++ | +++ |
| 6 | 5 (2,5) | 0,4 (0,2) | 12,5 | ++++ | ++++ |
| 7 | 2 (1) | 0,1 (0,05) | 20 | ++++ | ++++ |
| 8 | 5 (2,5) | 0,25 (0,12) | 20 | ++++ | ++++ |
| 9 | 8 (4) | 0,4 (0,2) | 20 | ++++ | ++++ |
| 10 | 5 (2,5) | 0,166 (0,083) | 30 | ++++ | ++++ |
| Comparative | | | | | |
| 11 | 1 (0,5) | 0,05 (0,025) | 20 | 0 | |
| 12 | 2,5 (1,25) | 10 (5) | 0,25 | 0 | |

EXAMPLES 12-17

The procedure of Examples 1-12 is repeated except that the support is of transparent Terphane® (polyethylene terephthalate sold by Rhône-Poulenc) having a thickness of 0.05 mm instead of Estar.

The results are gathered in the following Table II. They are similar to those obtained with Estar® (Ex. 1-12).

TABLE II

| Examples | GAFAC Conc. $C_1$ g/l (coverage mg/dm$^2$) | Gelatin Conc. $C_2$ g/l (coverage mg/dm$^2$) | $C_1/C_2$ | Transfer | Appearance |
|---|---|---|---|---|---|
| 13 | 5 (2,5) | 2,5 (1,25) | 2 | ++++ | +++ |
| 14 | 2,8 (1,4) | 0,7 (0,35) | 4 | ++++ | +++++ |
| 15 | 2,5 (1,25) | 0,5 (0,25) | 5 | +++ | +++ |
| 16 | 3 (1,5) | 0,5 (0,25) | 6 | +++ | +++ |
| 17 | 5 (2,5) | 0,166 (0,083) | 30 | ++++ | +++++ |

EXAMPLES 18-21

The procedure of examples 1-12 is repeated except that as surfactants are used Cemulsol® NP6 and Cemulsol® DR 311 which are an ethoxylated nonylphenol and an ethoxylated straight chain alcohol, respectively, instead of GAFAC PE 510. (Cemulsol is a trademark sold by Rhône-Poulenc).

The results are gathered in Table III.

TABLE III

| Examples | Surfactant Type | Surfactant Conc. $C_1$ g/l (coverage mg/dm$^2$) | Gelatin Conc. $C_2$ g/l (coverage mg/dm$^2$) | $C_1/C_2$ | Transfer | Appearance |
|---|---|---|---|---|---|---|
| 18 | Cemulsol NP6 | 2,5 (1,25) | 0,125 (0,062) | 20 | ++++ | ++++ |
| 19 | | 2 (1) | 0,166 (0,083) | 12 | ++++ | ++++ |
| 20 | Cemulsol DB 311 | 2,5 (1,25) | 0,125 (0,062) | 20 | ++++ | ++++ |
| 21 | | 2 (1) | 0,166 (0,083) | 12 | ++++ | ++++ |

EXAMPLES 22-27

The procedure of examples 1-12 is repeated except that a polyimide support having a thickness of 0.05 mm is used with the three surfactants of the preceding examples.

The results are gathered in Table VI.

TABLE IV

| Examples | Surfactant Type | Surfactant Conc. $C_1$ g/l (coverage mg/dm$^2$) | Gelatin Conc. $C_2$ g/l (coverage mg/dm$^2$) | $C_1/C_2$ | Transfer | Appearance |
|---|---|---|---|---|---|---|
| 22 | GAFAC PE 510 | 2,5 (1,25) | 0,125 (0,062) | 20 | ++++ | ++++ |
| 23 | | 2 (1) | 0,166 (0,083) | 12 | ++++ | ++++ |
| 24 | Cemulsol NP 6 | 2,5 (1,25) | 0,125 (0,062) | 20 | ++++ | ++++ |
| 25 | | 2 (1) | 0,166 (0,083) | 12 | ++++ | ++++ |
| 26 | Cemulsol DB 311 | 2,5 (1,25) | 0,125 (0,062) | 20 | ++++ | ++++ |
| 27 | | 2 (1) | 0,166 (0,083) | 12 | ++++ | ++++ |

We claim:

1. A support for the thermal transfer of electrostatic toner pigments which comprises a base and a receiving layer for the pigments wherein the receiving layer is formed of gelatin, as a hydrophilic binder, and a surface-active agent in which the concentration of the surface-active agent is at least 1 $mg/dm^2$ and is at least 2 times that of the hydrophilic binder and the thickness of the support is between 0.05 and 0.2 mm.

2. A support according to claim 1, in which the concentration of the surface-active agent is at least 5 times that of the hydrophilic binder.

3. A support according to claim 1, in which the concentration of the surface-active agent is at least 10 times that of the hydrophilic binder.

4. A support according to claim 1, in which the surface-active agent concentration is between 0.5 $mg/dm^2$ and 5 $mg/dm^2$.

5. A support according to claim 1, in which the surface-active agent is soluble or capable of being dispersed in an aqueous solution of the hydrophilic binder.

6. A support according to claim 1, in which the surface-active agent is a phosphoric ester, an alcohol or an ethoxylated phenol.

7. A support according to claim 1, in which the base is constituted of ethylene terephthalate or polyimide.

* * * * *